US008497661B2

(12) United States Patent
Murao et al.

(10) Patent No.: US 8,497,661 B2
(45) Date of Patent: Jul. 30, 2013

(54) EQUALIZATION DEVICE, EQUALIZATION PROCESSING PROGRAM, BATTERY SYSTEM, ELECTRIC VEHICLE AND EQUALIZATION PROCESSING METHOD

(75) Inventors: Hiroya Murao, Hirakata (JP); Yutaka Yamauchi, Himeji (JP); Kimihiko Furukawa, Kakogawa (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 296 days.

(21) Appl. No.: 12/957,006

(22) Filed: Nov. 30, 2010

(65) Prior Publication Data

US 2011/0127963 A1 Jun. 2, 2011

(30) Foreign Application Priority Data

Nov. 30, 2009 (JP) ................................. 2009-271733

(51) Int. Cl.
*H02J 7/00* (2006.01)
(52) U.S. Cl.
USPC .......................................... 320/118; 320/119
(58) Field of Classification Search
USPC ................................................. 320/118, 119
See application file for complete search history.

(56) References Cited

U.S. PATENT DOCUMENTS

| 4,451,773 | A | * | 5/1984 | Papathomas et al. .......... 320/128 |
| 5,932,932 | A | * | 8/1999 | Agatsuma et al. ............ 307/10.6 |
| 6,563,291 | B2 | * | 5/2003 | Tamura et al. ................. 320/116 |
| 6,771,045 | B1 | * | 8/2004 | Keller ............................ 320/118 |
| 2004/0164706 | A1 | * | 8/2004 | Osborne ........................ 320/116 |
| 2010/0231166 | A1 | * | 9/2010 | Lee et al. ...................... 320/118 |

FOREIGN PATENT DOCUMENTS

| JP | 11-299122 A | 10/1999 |
| JP | 2000-092733 A | 3/2000 |
| JP | 2003-284253 | 10/2003 |
| JP | 2007-288883 A | 11/2007 |
| JP | 2007-288886 A | 11/2007 |
| JP | 2008-182876 A | 8/2008 |
| JP | 2009-017630 | 1/2009 |
| WO | 2009/113530 A1 | 9/2009 |

* cited by examiner

*Primary Examiner* — M'Baye Diao
(74) *Attorney, Agent, or Firm* — NDQ & M Watchstone LLP

(57) ABSTRACT

A battery ECU acquires open circuit voltages of a plurality of battery cells that are divided into a plurality of groups A, B, C using a plurality of detecting units, and calculates SOCs of the battery cells based on the open circuit voltages. Then, the battery ECU selects the group to which the battery cell having the largest SOC among the SOCs of the plurality of battery cells belongs, and selects the battery cell to be discharged in the selected group. A series circuit composed of a resistor and a switching element is connected in parallel with each battery cell. The battery ECU turns on the switching element corresponding to the selected battery cell. At this time, the battery cell is connected to the resistor, thus being discharged.

10 Claims, 8 Drawing Sheets

F I G. 1
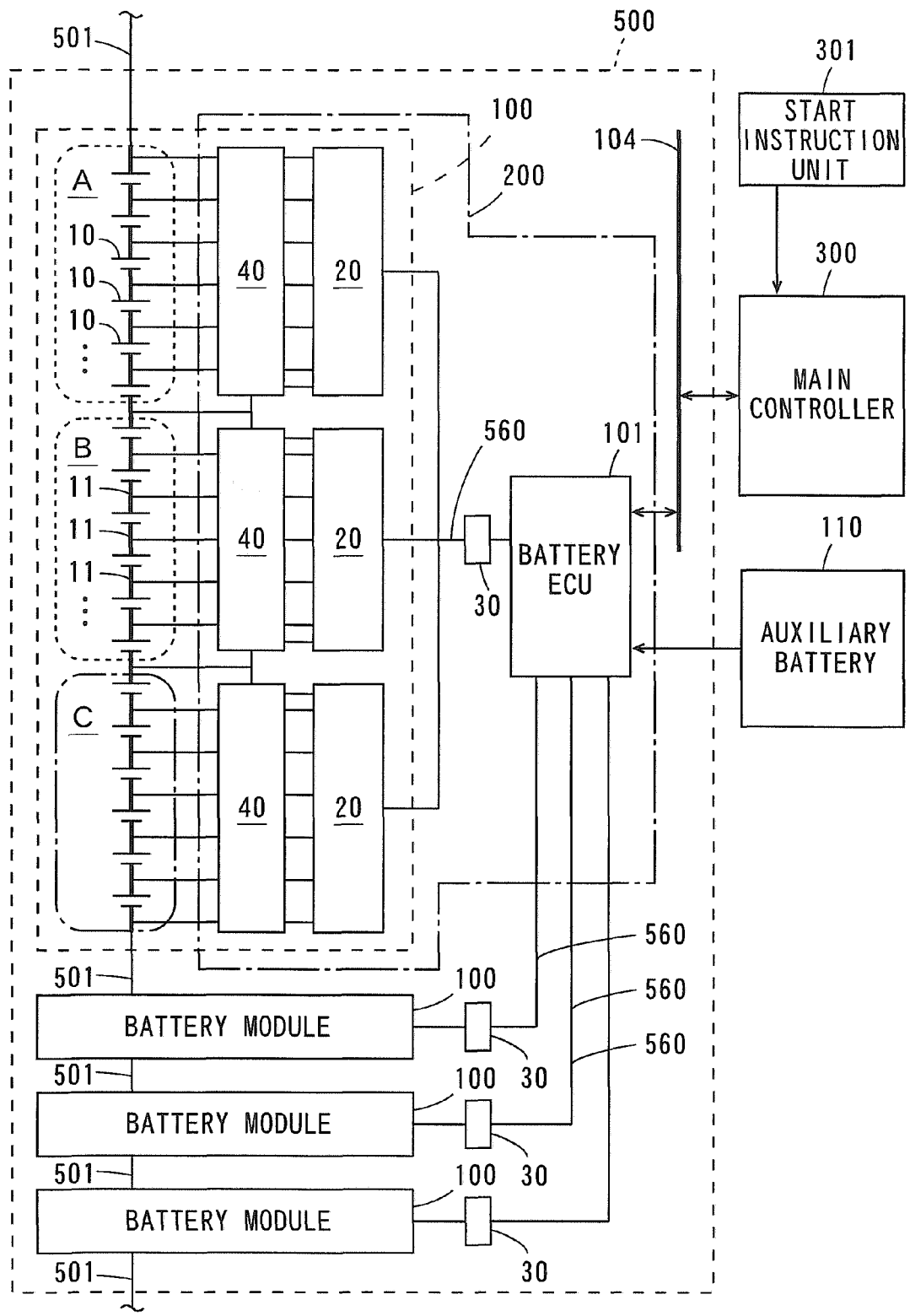

EQUALIZATION DEVICE, EQUALIZATION PROCESSING PROGRAM, BATTERY SYSTEM, ELECTRIC VEHICLE AND EQUALIZATION PROCESSING METHOD

CROSS REFERENCE TO RELATED APPLICATIONS

This application claims priority to Japanese Patent App. No. 2009-271733, filed Nov. 30, 2009, which is incorporated herein by reference in its entirety.

BACKGROUND OF THE INVENTION

1. Field of the Invention

The present invention relates to an equalization device that performs equalization processing of batteries, an equalization processing program, a battery system, an electric vehicle and equalization processing method.

2. Description of the Background Art

Chargeable and dischargeable battery modules are used as driving sources of movable objects such as electric automobiles. Such battery modules each have a plurality of battery cells (electric cells) connected in series, for example.

There have recently been developed battery modules using lithium-ion batteries as the plurality of battery cells. The characteristics of the lithium-ion battery are more prone than a nickel metal hydride battery to deterioration to be caused by overcharge and overdischarge.

Charge-discharge characteristics vary among the plurality of battery cells. Therefore, it is preferable that charge-discharge of each battery cell is individually controlled in order to prevent the battery cell from being overcharged or overdischarged.

There has been proposed a method of detecting remaining capacities of the plurality of battery cells (amounts of charges stored in the battery cells in a given state) and equalizing the remaining capacities of the battery cells based on the detected remaining capacities (see JP 2003-284253 A, for example).

A battery module described in JP 2003-284253 A includes a battery block (battery pack), a voltage measuring circuit, a microcomputer, a plurality of bypass resistors and a plurality of field effect transistors (FETs).

The battery block is composed of a plurality of battery cells connected in series. The bypass resistor and the FET are connected in parallel to each battery cell. The voltage measuring circuit is connected to the plurality of battery cells, and acquires open circuit voltage values of the plurality of battery cells. The microcomputer is connected to the voltage measuring circuit and the plurality of FETs.

In the battery module, an adjustment amount and an adjustment time period of the remaining capacities of the battery cells are calculated based on the open circuit voltage values of the plurality of battery cells acquired by the voltage measuring circuit for equalizing the remaining capacities of the plurality of battery cells. At this time, an identification number and the adjustment time period of each battery cell that requires the adjustment (an adjustment target battery cell) of the plurality of battery cells are stored in the microcomputer.

The FETs connected to the adjustment target battery cells are simultaneously switched from an OFF state to an ON state at a given timing. The FETs connected in parallel to the adjustment target battery cells are maintained in an ON state during the calculated adjustment time period, thereby causing currents to flow through the bypass resistors. This causes the adjustment target battery cells to be discharged, thus equalizing the remaining capacities of the plurality of battery cells.

When the number of the plurality of battery cells constituting the foregoing battery module is increased, discharge currents flow through a large number of bypass resistors during the equalization of the remaining capacities of the plurality of battery cells. This increases heat generation by the bypass resistors.

BRIEF SUMMARY OF THE INVENTION

An object of the present invention is to provide an equalization device capable of equalizing a plurality of battery cells while suppressing heat generation, an equalization processing program, a battery system, an electric vehicle and equalization processing method.

According to an aspect of the present invention, an equalization device is arranged to perform equalization processing of charge states of a plurality of battery cells that are connected in series, wherein the plurality of battery cells are divided into a plurality of groups, the equalization device includes a detector arranged to detect the charge states of the plurality of battery cells, a selector arranged to select any of the plurality of groups based on the charge states detected by the detector, and an equalization processing unit arranged to perform the equalization processing by selectively causing the battery cells that belong to the group selected by the selector to discharge.

In the equalization device, any of the plurality of groups is selected by the selector based on the charge states detected by the detector, and the battery cells that belong to the selected group are selectively discharged, thereby performing the equalization processing of the charge states of the plurality of battery cells.

In this case, the battery cells that belong to the different groups are discharged at different timings. Thus, the number of the battery cells that are discharged at the same time can be decreased. This leads to lower discharge currents from the battery cells that are discharged at the same time. As a result, the plurality of battery cells can be reliably equalized while heat generation can be suppressed.

The selector may select the group to which the battery cell having a highest charge state among the charge states of the plurality of battery cells detected by the detector belongs.

In this case, variation in the charge states of the plurality of battery cells can be quickly and reliably reduced.

The detector may include a plurality of detecting units corresponding to the plurality of groups, respectively, and each of the plurality of detecting units may be configured to detect the charge states of the battery cells that belong to the corresponding group.

In this case, since the plurality of detecting units correspond to the plurality of groups, respectively, the charge states of the battery cells that belong to the groups can be easily detected by the detecting units corresponding to the groups, respectively.

The plurality of battery cells may be divided into the plurality of groups such that each two of the battery cells that are connected adjacent to each other belong to different groups.

In this case, each two of the battery cells that are connected adjacent to each other are discharged at different timings. This causes heating portions to be distributed, thus preventing a local increase in temperature.

The plurality of groups may include a first group to an M-th group, M may be a natural number of not less than two, the plurality of battery cells may include a first battery cell to an N-th battery cell sequentially arranged from one end to the other end of series connection, and N may be a natural number of not less than 2M, and the plurality of battery cells may be divided into the plurality of groups such that when a remainder resulting from dividing i by M is k, an arbitrary i-th battery cell belongs to a "k+1-th" group.

Accordingly, the plurality of battery cells are divided into the plurality of groups such that each two of the battery cells that are connected adjacent to each other belong to different groups. This causes each two of the battery cells that are connected adjacent to each other are discharged at different timings. This causes heating portions to be distributed, thus preventing a local increase in temperature.

The charge state may be any of a rate of charge, a remaining capacity, a voltage, a depth of discharge, a current integrated value and a difference of an amount of stored charges. The charge states of the plurality of battery cells can be equalized in any of the cases of using the rate of charge, the remaining capacity, the voltage, the depth of discharge, the current integrated value and the difference of the amount of stored charges as the charge state.

According to another aspect of the present invention, an equalization processing program that is executable by a computer for performing equalization processing of charge states of a plurality of battery cells that are connected in series and divided into a plurality of groups causes the computer to execute the processes of acquiring the charge states of the plurality of battery cells, selecting any of the plurality of groups based on the acquired charge states, and performing the equalization processing by selectively causing the battery cells that belong to the selected group to discharge.

In the equalization processing program, any of the plurality of groups is selected based on the acquired charge states, and the battery cells that belong to the selected group are selectively discharged, thereby performing the equalization processing of the charge states of the plurality of battery cells.

In this case, the battery cells that belong to the different groups are discharged at different timings. Thus, the number of the battery cells that are discharged at the same time can be decreased. This leads to lower discharge currents from the battery cells that are discharged at the same time. As a result, the plurality of battery cells can be reliably equalized while heat generation can be suppressed.

According to still another aspect of the present invention, a battery system includes a plurality of battery cells that are connected in series, and the equalization device according to the one aspect of the present invention.

Since the battery system is provided with the equalization device according to the one aspect of the present invention, the plurality of battery cells can be reliably equalized while heat generation can be suppressed. This improves reliability and realizes longer life of the battery system.

According to yet another aspect of the present invention, an electric vehicle includes a plurality of battery cells that are connected in series and divided into a plurality of groups, the equalization device according to the one aspect of the present invention, a motor driven by electric power supplied from the plurality of battery cells, and a drive wheel rotated by a torque generated by the motor.

In the electric vehicle, the motor is driven by the electric power supplied from the plurality of battery cells. The drive wheel is rotated by the torque generated by the motor, thereby moving the electric vehicle.

Since the electric vehicle is provided with the equalization device according to the one aspect of the present invention, the plurality of battery cells can be reliably equalized while heat generation can be suppressed. This improves reliability and realizes longer life of the electric vehicle.

According to still another aspect of the present invention, an equalization processing method for performing equalization processing of charge states of a plurality of battery cells that are connected in series and divided into a plurality of groups includes the steps of acquiring the charge states of the plurality of battery cells, selecting any of the plurality of groups based on the acquired charge states, and performing the equalization processing by selectively causing the battery cells that belong to the selected group to discharge.

In the equalization processing method, any of the plurality of groups is selected based on the acquired charge states, and the battery cells that belong to the selected group are selectively discharged, thereby performing the equalization processing of the charge states of the plurality of battery cells.

In this case, the battery cells that belong to the different groups are discharged at different timings. Thus, the number of the battery cells that are discharged at the same time can be decreased. This leads to lower discharge currents from the battery cells that are discharged at the same time. As a result, the plurality of battery cells can be reliably equalized while heat generation can be suppressed.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWINGS

FIG. 1 is a block diagram showing the configuration of a battery system including an equalization device according to a first embodiment;

DETAILED DESCRIPTION OF THE INVENTION

1 First Embodiment

Figure 2:
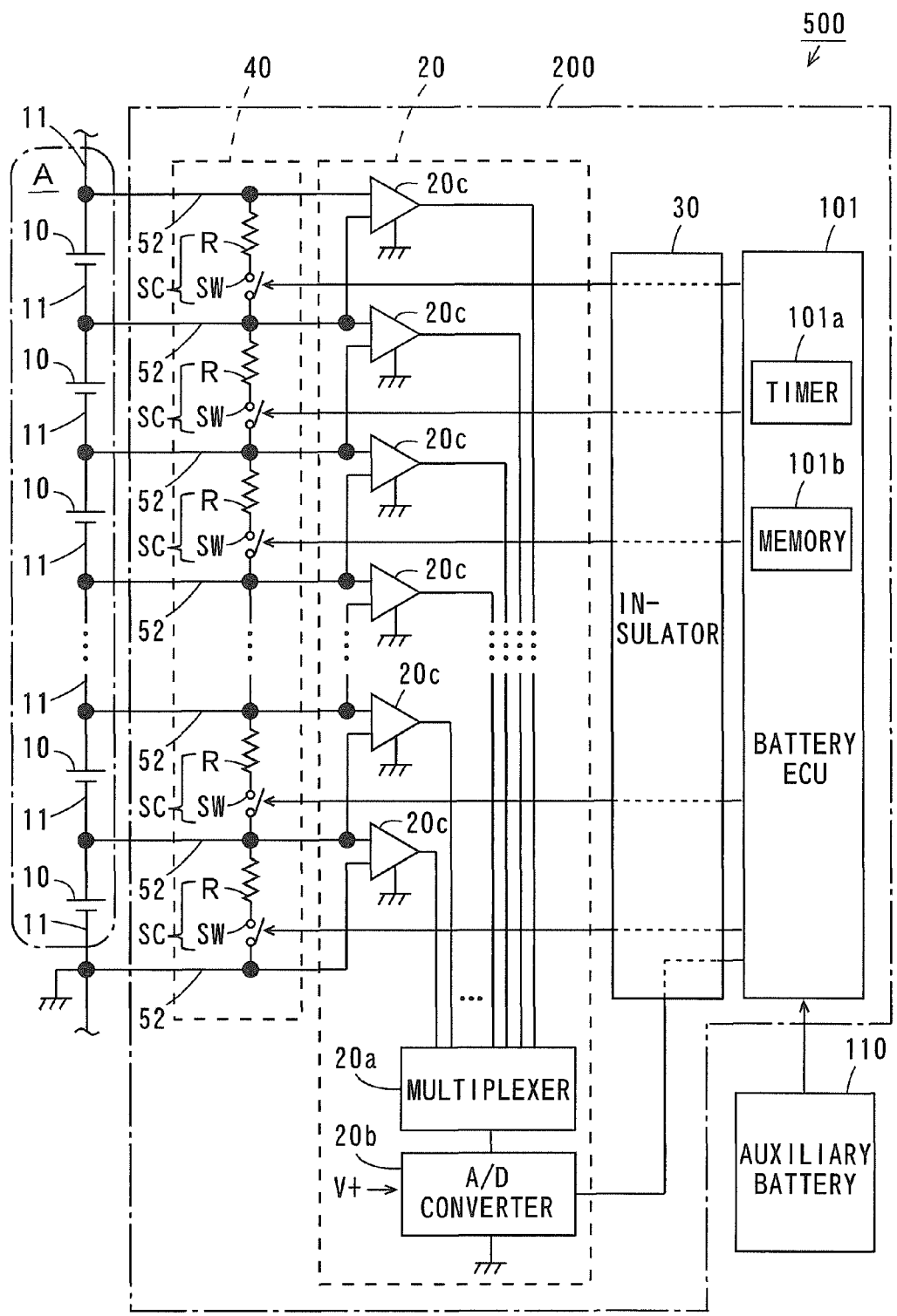
FIG. 2 is a block diagram showing the detailed configuration of the equalization device of FIG. 1.

Description will be made of an equalization device, an equalization processing program and a battery system according to a first embodiment while referring to drawings. The equalization device according to the present embodiment is used as one of components constituting the battery system that is mounted on an electric vehicle using electric power as a driving source, and equalizes charge states of a plurality of battery cells. Examples of the electric vehicle include a hybrid electric vehicle, a battery electric vehicle, and a plug-in hybrid electric vehicle. The electric vehicle refers to a hybrid electric vehicle in the present embodiment.

In the following description, an amount of electric charges stored in a battery cell in a full charge state is referred to as a full charge capacity. An amount of electric charges stored in the battery cell in a given state is referred to as a remaining capacity. A ratio of the remaining capacity to the full charge capacity of the battery is referred to as an SOC (a rate of charge). In the present embodiment, the SOC of the battery cell is used as an example of the charge state of the battery cell.

(1) Configuration of the Battery System

FIG. 1 is a block diagram showing the configuration of a battery system including the equalization device according to the first embodiment. In the present embodiment, the battery system 500 includes a plurality of battery modules 100 (four in the example of FIG. 1) and a battery electronic control unit (hereinafter referred to as a battery ECU) 101, and connected to a main controller 300 of the electric vehicle through a bus 104.

The main controller 300 includes a central processing unit (CPU), for example, and controls the battery system 500 and a motor and so on included in the electric vehicle. The motor generates a driving force during driving of the electric vehicle.

A start instruction unit 301 is connected to the main controller 300. The start instruction unit 301 includes a start key used for instructing the electric vehicle to start. When the start key is turned on by a user, the main controller 300 controls the battery system 500 such that electric power can be supplied to the above-mentioned motor. This allows the electric vehicle to be driven.

The plurality of battery modules 100 of the battery system 500 are connected to one another through power supply lines 501. Each battery module 100 includes a plurality of (eighteen in the example of FIG. 1) battery cells 10, a plurality of (three in the example of FIG. 1) detecting units 20 and a plurality of (three in the example of FIG. 1) discharging units 40.

The plurality of battery cells 10 are connected in series through a plurality of bus bars 11 in each battery module 100. Each of the battery cells 10 is a secondary battery. A lithium-ion battery is used as the secondary battery in this example.

The battery cells 10 arranged at both ends of the battery module 100 are connected to the power supply lines 501 through the bus bars 11, respectively. In this manner, all the battery cells 10 of the plurality of battery modules 100 are connected in series in the battery system 500. The power supply lines 501 pulled out from the battery system 500 are connected to a load such as the motor of the electric vehicle.

The plurality of battery cells 10 in each battery module 100 are divided into a plurality of groups. Each group includes the plurality of battery cells 10 that are connected in consecutive order in series. In the example of FIG. 1, the first to eighteenth battery cells 10 are sequentially connected in series. The group A includes the first to sixth battery cells 10, the group B includes the seventh to twelfth battery cells 10, and the group C includes the thirteenth to eighteenth battery cells 10.

The plurality of detecting units 20 are provided corresponding to the plurality of groups, respectively. Also, the plurality of discharging units 40 are provided corresponding to the plurality of groups, respectively. In the example of FIG. 1, the three detecting units 20 and the three discharging units 40 are provided corresponding to the groups A, B, C, respectively.

The plurality of battery cells 10 of each group are connected to the detecting unit 20 corresponding to the group via the discharging unit 40 corresponding to the group. In the example of FIG. 1, the six battery cells 10 belonging to the group A are connected to the detecting unit 20 corresponding to the group A via the discharging unit 40 corresponding to the group A. The six battery cells 10 belonging to the group B are connected to the detecting unit 20 corresponding to the group B via the discharging unit 40 corresponding to the group B. The six battery cells 10 belonging to the group C are connected to the detecting unit 20 corresponding to the group C via the discharging unit 40 corresponding to the group C.

The plurality of detecting units 20 of each battery module 100 are connected to the battery ECU 101 through communication lines 560 via an insulator 30.

The detecting unit 20 detects charge states of the plurality of battery cells 10, and applies the charge states to the battery ECU 101. The detecting unit 20 may apply the detected charge states of the plurality of battery cells 10 to the battery ECU 101 as digital values. The detecting unit 20 may multiplex the detected charge states of the plurality of battery cells 10 and apply the multiplexed charge states to the battery ECU 101.

Each detecting unit 20 detects terminal voltages of the plurality of battery cells 10 of the corresponding group as the charge states, and applies the terminal voltages to the battery ECU 101 in the present embodiment. Each discharging unit 40 is controlled by the battery ECU 101 and used for causing the plurality of battery cells 10 of the corresponding group to discharge. Specific examples of the plurality of detecting units 20 and the plurality of discharging units 40 will be described below.

In the battery system 500 of FIG. 1, the equalization device 200 is composed of the plurality of detecting units 20, the plurality of insulators 30, the plurality of discharging units 40 and the battery ECU 101.

An auxiliary battery 110 of the electric vehicle is connected to the battery ECU 101 of the equalization device 200. The auxiliary battery 110 is used as a power source of the battery ECU 101. The auxiliary battery 110 is a lead-acid battery in the present embodiment. Meanwhile, the plurality of battery cells 10 connected in series are used as power sources of the plurality of detecting units 20 and the plurality of discharging units 40. Communication is established between the battery ECU 101 and the plurality of detecting units 20 via the insulator 30. Therefore, the battery ECU 101 operated by the auxiliary battery 110 and each of the detecting units 20 and discharging units 40 operated by the plurality of battery cells 10 are connected to communicate with each other while being electrically insulated from each other by the insulator 30. As a result, the battery ECU 101 can stably and independently operate, and the plurality of detecting units 20 and plurality of discharging units 40 can be stably and independently operated. An insulating element such as a digital isolator, a photocoupler or the like can be used as the insulator 30.

The battery ECU 101 is connected to the main controller 300 through the bus 104. As described above, the plurality of detecting units 20 apply the terminal voltages of the plurality of battery cells 10 of the corresponding groups to the battery ECU 101. Thus, the battery ECU 101 detects the remaining capacity of each battery module 100 (the remaining capacities of the plurality of battery cells 10), and applies detection results to the main controller 300.

When the start key of the start instruction unit 301 is turned on, the main controller 300 controls mechanical power of the electric vehicle (a rotational speed of the motor, for example) based on the remaining capacities applied from the battery ECU 101. When the remaining capacity of each battery module 100 decreases, the main controller 300 controls a power generator, not shown, connected to the power supply line 501 to charge each battery module 100 (the plurality of battery cells 10).

The above-mentioned motor connected to the power supply line 501, for example, functions as the power generator in the present embodiment. In this case, the motor converts electric power supplied from the battery system 500 into mechanical power for driving a drive wheel, not shown, at the time of acceleration of the electric vehicle, and generates regenerated electric power at the time of deceleration of the electric vehicle. Each battery module 100 is charged with the regenerated electric power.

When the start key of the start instruction unit 301 is turned off, the main controller 300 controls the battery ECU 101 to perform equalization processing of the plurality of battery cells 10. The battery ECU 101 detects current consumption by the auxiliary battery 110 in the equalization processing. Details of the equalization processing will be described below.

FIG. 2 is a block diagram showing a specific example of the configuration of the equalization device 200 of FIG. 1. The example of FIG. 2 show the plurality of battery cells 10 belonging to the group A of FIG. 1 and the detecting unit 20 and the discharging unit 40 corresponding to the group A.

As shown in FIG. 2, the detecting unit 20 includes a multiplexer 20a, an A/D (Analog/Digital) converter 20b and a plurality of differential amplifiers 20c. The discharging unit 40 includes a plurality of series circuits SC each composed of a resistor R and a switching element SW.

The plurality of differential amplifiers 20c of the detecting unit 20 are provided corresponding to the plurality of battery cells 10, respectively, belonging to the corresponding group. Each differential amplifier 20c has two input terminals and an output terminal. The two input terminals of each differential amplifier 20c are electrically connected to the two bus bars 11 that are adjacent to each other with the corresponding battery cell 10 therebetween through conductor lines 52. Each differential amplifier 20c differentially amplifies voltages input to the two input terminals, and outputs the amplified voltages from the output terminal.

The output voltages from the plurality of differential amplifiers 20c are applied to the multiplexer 20a. The multiplexer 20a sequentially outputs the output voltages from the plurality of differential amplifiers 20c to the A/D converter 20b. The A/D converter 20b converts the output voltages from the multiplexer 20a into digital values, and applies the converted digital values to the battery ECU 101 via the insulator 30 as the terminal voltages. In this manner, the terminal voltages of the plurality of battery cells 10 are sequentially applied from the A/D converter 20b to the battery ECU 101.

The plurality of series circuits SC of the discharging unit 40 are also provided corresponding to the plurality of battery cells 10, respectively, belonging to the corresponding group (the group A in the example of FIG. 2). Each series circuit SC is electrically connected to the two bus bars 11 that are adjacent to each other with the corresponding battery cell 10 therebetween through the conductor lines 52. The battery ECU 101 controls the switching elements SW to be turned on and off through the insulator 30.

The battery ECU 101 includes a central processing unit (CPU), a timer 101a and a memory 101b. The battery ECU 101 may include a microcomputer instead of the CPU and the memory 101b. The timer 101a is used for measuring start time described below. The memory 101b stores an equalization processing program for performing the equalization processing, described below, and stores various information used in the equalization processing.

As described above, when the start key of the start instruction unit 301 is turned off, the CPU of the battery ECU 101 executes the equalization processing program stored in the memory 101b, thereby performing the equalization processing of the plurality of battery cells 10.

(2) Equalization of the Plurality of Battery Cells

In the equalization device 200 according to the present embodiment, the plurality of battery cells 10 of the group selected from the plurality of groups by the battery ECU 101 are equalized, as described below. The groups are periodically selected by the battery ECU 101. In the following paragraphs, description is made of the equalization processing performed on the plurality of battery cells 10 of the selected group.

Figure 3:
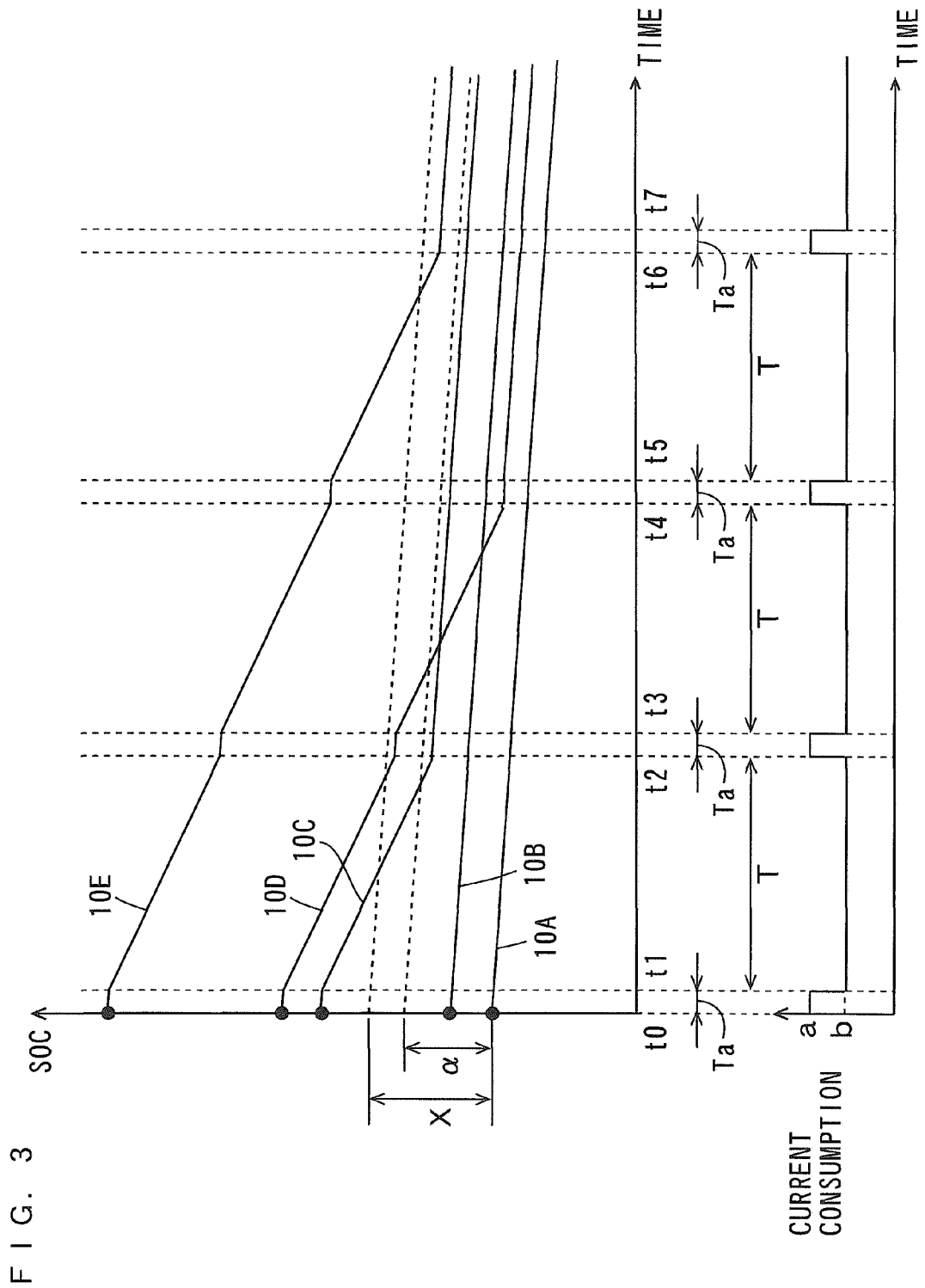
FIG. 3 is a diagram showing change in an SOC of each battery cell and change in current consumption by a battery ECU in equalization processing.

FIG. 3 is a diagram showing change in an SOC of each battery cell 10 and change in current consumption by the battery ECU 101 in the equalization processing. In the upper stage of FIG. 3, the ordinate represents the SOC of each battery cell 10, and the abscissa represents time. In the lower stage of FIG. 3, the ordinate represents the current consumption by the battery ECU 101, and the abscissa represents time.

Description is made of the case where one group is continued to be selected in the following paragraphs. In practice, however, the group including the battery cell 10 having the maximum SOC is selected in turn, as described below.

FIG. 3 shows changes in the SOCs of the five battery cells 10 belonging to the one group. Hereinafter, the five battery cells 10 shown in FIG. 3 are referred to as the battery cells 10A, 10B, 10C, 10D, 10E.

The switching elements SW corresponding to the plurality of battery cells 10 are periodically switched such that a difference between the maximum SOC (hereinafter referred to as the SOCmax) and the minimum SOC (hereinafter referred to as the SOCmin) of the SOCs of the plurality of battery cells 10 in the battery system 500 is not more than a prescribed value X that has been preset. While the battery cell 10 having the SOCmin belongs to the same group as the battery cell 10 having the SOCmax in the example of FIG. 3, the battery cell 10 having the SOCmin may belong to another group in some cases.

The switching elements SW are periodically switched in the following manner. First, the SOC of each battery cell 10 is periodically detected, and the SOCmin and the SOCmax are periodically determined. Then, the switching element SW corresponding to the battery cell 10, which has the larger SOC than a value (SOCmin+$\alpha$) obtained by adding a prescribed value $\alpha$ that has been preset to the SOCmin, is turned on. Meanwhile, the switching element SW corresponding to the battery cell 10 having the SOC of not more than the SOCmin+$\alpha$ is turned off.

In the example of FIG. 3, the switching elements SW corresponding to all the battery cells 10A to 10E are turned off at a time point t0. The SOC of the battery cell 10E is the SOCmax, and the SOC of the battery cell 10A is the SOCmin in a period from the time point t0 to a time point t1, during which a given processing time period Ta elapses. A difference between the SOC of the battery cell 10E and the SOC of the battery cell 10A is larger than the prescribed value X. The SOC of each of the battery cells 10C to 10E is larger than the SOCmin+$\alpha$, and the SOC of each of the battery cells 10A, 10B is not more than the SOCmin+$\alpha$.

In this case, the switching elements SW corresponding to the battery cells 10C to 10E are turned on at the time point t1. Thus, the charges stored in the battery cells 10C to 10E are discharged through the resistors R, causing the SOCs of the battery cells 10C to 10E to gradually decrease. Meanwhile, the charges stored in the battery cells 10A, 10B are consumed by the detecting unit 20 and the discharging unit 40. This also causes the SOCs of the battery cells 10A, 10B to gradually decrease.

A rate of change in the SOC of each of the battery cells 10C to 10E is larger than that of each of the battery cells 10A, 10B.

Here, the rate of change in the SOC refers to an amount of change in the SOC per unit time. This causes the SOC of each of the battery cells 10C to 10E to come close to the SOC of the battery cell 10A.

After an elapse of a preset equalization processing time period T from the time point t1, that is, at a time point t2, the switching elements SW corresponding to the battery cells 10C to 10E are turned off. In a period from the time point t2 to a time point t3, during which the given processing time period Ta elapses, the difference between the SOC (SOCmin) of the battery cell 10A and the SOC (SOCmax) of the battery cell 10E is larger than the prescribed value X. The SOC of each of the battery cells 10D, 10E is larger than the SOCmin+α, and the SOC of each of the battery cells 10A to 10C is not more than the SOCmin+α.

In this case, the switching elements SW corresponding to the battery cells 10D, 10E are turned on at the time point t3. This causes the SOC of each of the battery cells 10D, 10E to come close to the SOC (SOCmin) of the battery cell 10A.

Next, the switching elements SW corresponding to the battery cells 10D, 10E are turned off after an elapse of the preset equalization processing time period T from the time point t3, that is, at a time point t4. In a period from the time point t4 to a time point t5, during which the given processing time period Ta elapses, the difference between the SOC (SOCmin) of the battery cell 10A and the SOC (SOCmax) of the battery cell 10E is larger than the prescribed value X. The SOC of the battery cell 10E is larger than the SOCmin+α, and the SOC of each of the battery cells 10A to 10D is not more than the SOCmin+α.

In this case, the switching element SW corresponding to the battery cell 10E is turned on at the time point t5. This causes the SOC of the battery cell 10E to come close to the SOC (SOCmin) of the battery cell 10A.

After an elapse of the preset equalization processing time period T from the time point t5, that is, at a time point t6, the switching element SW corresponding to the battery cell 10E is turned off. In a period from the time point t6 to a time point t7, during which the given processing time period Ta elapses, the difference between the SOCmin (the SOC of the battery cell 10A) and the SOCmax (the SOC of the battery cell 10E) is not more than the prescribed value X. Accordingly, the equalization processing is terminated.

In this manner, the equalization processing causes the differences among the SOCs of all the battery cells 10 to be within the range of the prescribed value X. This prevents overcharge and overdischarge from occurring when the plurality of battery cells 10 are charged and discharged through the power supply lines 501. As a result, each of the battery cells 10 is prevented from being deteriorated.

In this example, the battery ECU 101 is in an operating state in the period from the time point t0 to the time point t1, the period from the time point t2 to the time point t3, the period from the time point t4 to the time point t5, and the period from the time point t6 to the time point t7. In the operating state, the battery ECU 101 operates according to the equalization processing program, described below.

Meanwhile, the battery ECU 101 proceeds to a non-operating state in the period from the time point t1 to the time point t2, the period from the time point t3 to the time point t4, and the period from the time point t5 to the time point t6. In the non-operating state, the battery ECU 101 does not execute control operation such as switching of the switching elements SW. Thus, current consumption a by the battery ECU 101 in the operating state is larger than current consumption b by the battery ECU 101 in the non-operating state as shown in the lower stage of FIG. 3.

Description will be made of details of the equalization processing performed by the battery ECU 101 using the flowcharts.

(3) Equalization Processing

Figure 4:
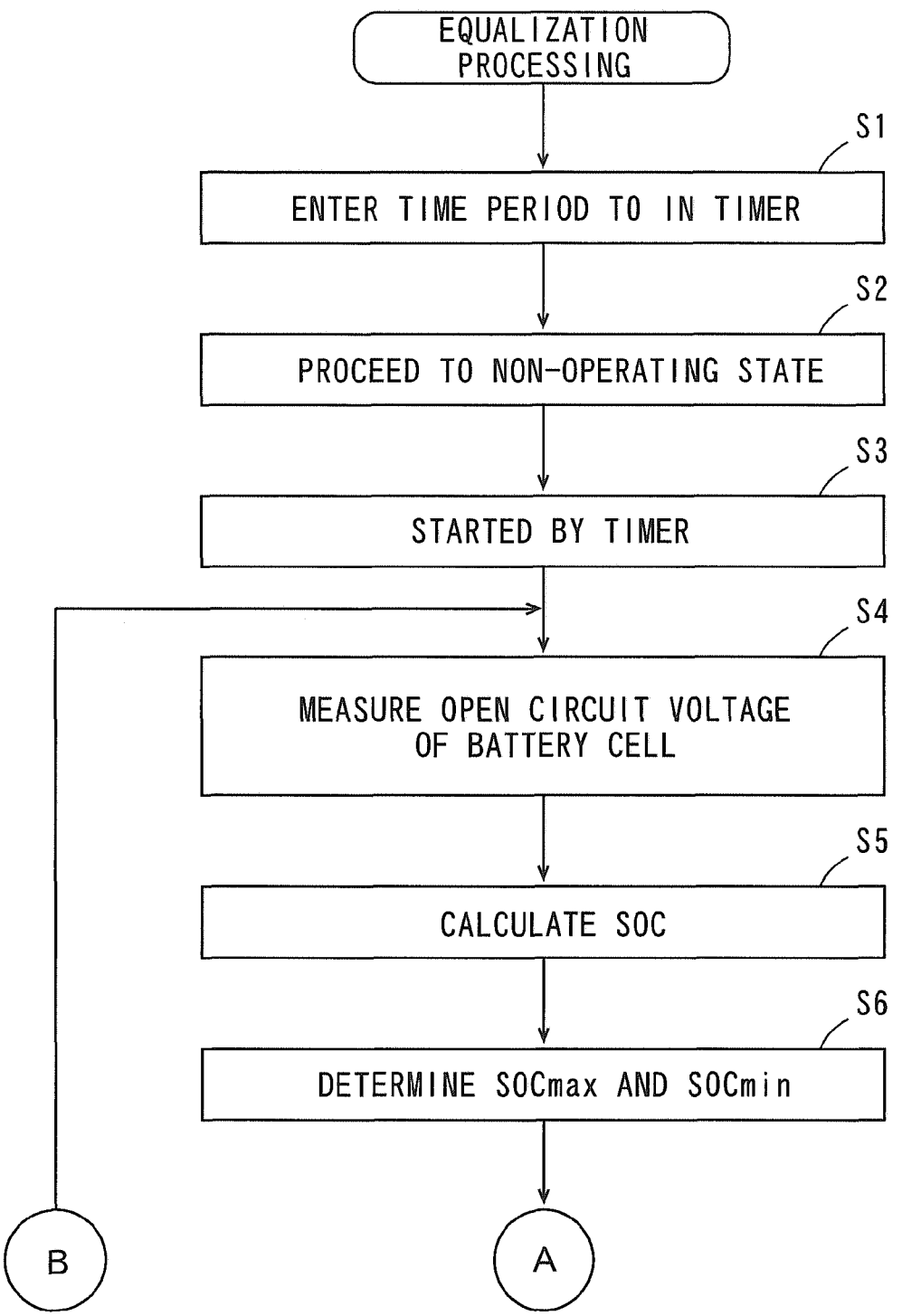
FIG. 4 is a flowchart of the equalization processing performed by the battery ECU.
Figure 5:
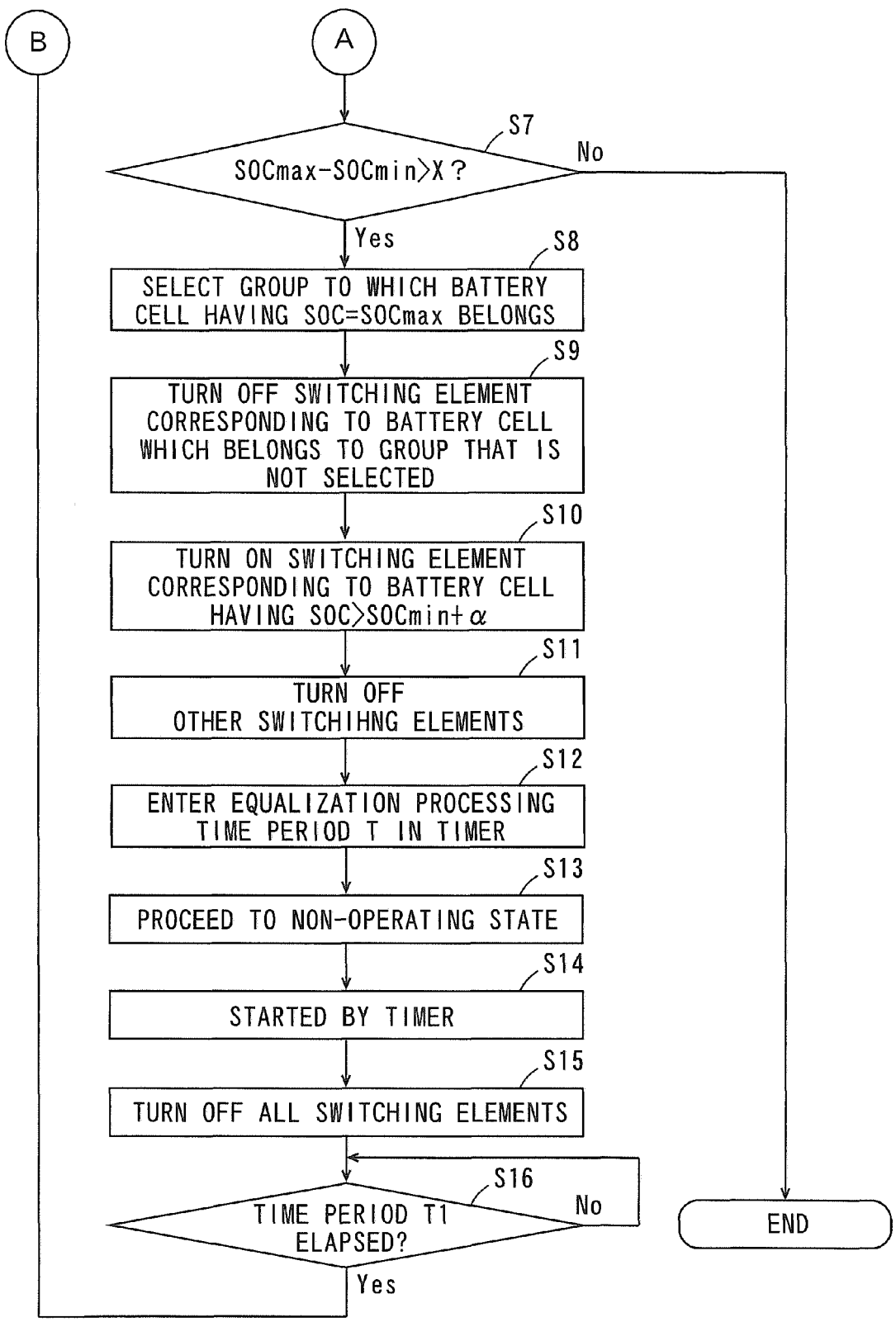
FIG. 5 is a flowchart of the equalization processing performed by the battery ECU.

FIGS. 4 and 5 are flowcharts of the equalization processing performed by the battery ECU 101. In the example of FIG. 4, the start key of the start instruction unit 301 is turned on, the battery ECU 101 is in the operating state, and all the switching elements SW are turned off in an initial state.

The equalization processing is started when the start key of the start instruction unit 301 is turned off.

As shown in FIG. 4, first, the battery ECU 101 enters a non-operating time period T0, which is previously stored in the memory 101b (FIG. 2), in the timer 101a (Step S1). In this case, an elapsed time since the non-operating time period T0 has been entered is measured by the timer 101a. The battery ECU 101 then proceeds to the non-operating state (Step S2).

When the elapsed time measured by the timer 101a reaches the non-operating time period T0, the battery ECU 101 is started, and proceeds to the operating state (Step S3). The non-operating time period T0 is set to 60 minutes, for example. In this case, since each battery cell 10 is kept not substantially charged or discharged during the non-operating time period T0, the terminal voltage of each battery cell 10 is stabilized.

Then, the battery ECU 101 measures the open circuit voltage of each battery cell 10 based on the terminal voltage of each battery cell 10 applied from the plurality of detecting units 20 (Step S4). The battery ECU 101 subsequently calculates the SOC of each battery cell 10 based on the relationship between the open circuit voltage of the battery cell 10 and the SOC stored in the memory 101b, and the measured open circuit voltage (Step S5).

Next, the battery ECU 101 determines the SOCmax and the SOCmin based on the calculated SOC of each battery cell 10 (Step S6).

As shown in FIG. 5, the battery ECU 101 subsequently determines whether or not SOCmax−SOCmin is larger than the prescribed value X stored in the memory 101b (Step S7).

Usable capacity of the battery module 100 is required to be not less than a given allowable value (hereinafter referred to as a use capacity allowable value) for maintaining driving performance of the electric vehicle. The prescribed value X can be set based on the full charged capacity of each battery cell 10 obtained by measurement and the use capacity allowable value that has been preset, for example.

When SOCmax−SOCmin is not more than the prescribed value X, the battery ECU 101 terminates the equalization processing. When SOCmax−SOCmin is larger than the prescribed value X, the battery ECU 101 determines the battery cell 10 having the SOCmax, and selects the group, to which the battery cell 10 belongs, from the plurality of groups (Step S8).

The battery ECU 101 then turns off the plurality of switching elements SW corresponding to the plurality of battery cells 10, respectively, belonging to the groups that are not selected (Step S9).

Next, the battery ECU 101 turns on the switching element SW corresponding to the battery cell 10, which has the larger SOC than the value obtained by adding the prescribed value a stored in the memory 101b to the SOCmin, of the plurality of battery cells 10 belonging to the selected group (Step S10), and turns off the other switching elements SW (Step S11).

The battery ECU 101 subsequently enters the equalization processing time period T, which is previously stored in the memory 101b, in the timer 101a (Step S12). In this case, an elapsed time since the equalization processing time period T has been entered is measured by the timer 101a. Then, the battery ECU 101 proceeds to the non-operating state (Step S13).

When the elapsed time measured by the timer 101a reaches the equalization processing time period T, the battery ECU 101 is started, and proceeds to the operating state (Step S14). Next, the battery ECU 101 turns off all the switching elements SW (Step S15).

The battery ECU 101 then determines whether or not a non-operating time period T1 stored in the memory 101b has elapsed since the battery ECU 101 has been started in Step S14 (Step S16). When the non-operating time period T1 has not elapsed, the battery ECU 101 stands by until the non-operating time period T1 elapses. When the non-operating time period T1 has elapsed, the battery ECU 101 repeats the processes of Steps S4 to S16. The non-operating time period T1 is several hundred milliseconds, for example.

Here, the above-mentioned equalization processing time period T needs to be appropriately set for efficient equalization processing. In the present embodiment, the equalization processing time period T is set to satisfy conditions of equations (2) and (3) shown below.

Average current consumption by the battery ECU 101 during the equalization processing is preferably not more than a given allowable value for maintaining the characteristics of the auxiliary battery 110 (FIG. 1).

Assuming that a represents the current consumption by the battery ECU 101 in the operating state and b represents the current consumption by the battery ECU 101 in the non-operating state, the average current consumption per unit time by the battery ECU 101 is obtained by $(a \times Ta + b \times T)/(Ta+T)$. Thus, when β represents the allowable value of the average current consumption, the following equation (1) is preferably satisfied:

$$\{a \times Ta + b \times T\}/(ta+T) \geq \beta \quad (1)$$

where a>β>b. Therefore, the following equation (2) is derived from the equation (1):

$$T \geq Ta \times (a-\beta)/(\beta-b) \quad (2)$$

Assuming that D1 represents the ratio of change in the SOC of the battery cell 10 when the corresponding switching element SW is turned on, and D2 represents the ratio of change in the SOC of the battery cell 10 when the corresponding switching element SW is turned off, an amount of change in the difference between the SOCs of the battery cells 10 is obtained by $T \times |D1-D2|$ in the equalization processing time period T.

As described above, when the difference between the SOCmax and the SOCmin is larger than the prescribed value X, the switching element SW corresponding to the battery cell 10, which has the larger SOC than the SOCmin+α, is turned on. Here, when $T \times |D1-D2|$ is larger than the prescribed value α, the SOC of the battery cell 10 whose corresponding switching element SW is turned on may become smaller than the SOCmin. That is, the battery cell 10 having SOCmin may be replaced.

Thus, in order to prevent the battery cell 10 having the SOCmin from being replaced, that is, to prevent the magnitude relationship between the SOC of the battery cell 10 having the SOCmin at the time of start of the equalization processing and the SOC of another battery cell 10 from being reversed, the following equation (3) needs to be satisfied:

$$T \times |D1-D2| \leq \alpha \quad (3)$$

The equalization processing time period T is set so as to satisfy the conditions of the foregoing equations (2) and (3), thereby allowing for efficient equalization processing.

The current consumption a and the processing time period Ta of the foregoing equation (2) can be measured by the battery ECU 101. D1−D2 of the foregoing equation (3) can be calculated by the battery ECU 101 based on the terminal voltages of the battery cells 10 detected by the detecting unit 20.

The battery ECU 101 may measure the values of the current consumption a and the processing time period Ta during the equalization processing, and calculate the value of D1−D2 and determine the equalization processing time period T by previously storing the foregoing current consumption b, allowable value β and prescribed value a in the memory 101b.

The foregoing allowable value β can be set depending on the capacity and so on of the auxiliary battery 110. The prescribed value α can be set so as not to exceed the upper limit of the prescribed value X.

While description is made of the example in which the equalization processing time period T is previously stored in the memory 101b in the foregoing equalization processing, the present invention is not limited to this. The battery ECU 101 may measure the values of the current consumption a and the processing time period Ta, and perform the equalization processing while calculating the value of D1−D2. In this case, the battery ECU 101 may determine the value of the equalization processing time period T every time it enters a starting state based on the measured values of the current consumption a and processing time period Ta and the calculated value of D1−D2. Accordingly, the equalization processing time period T is always set to the appropriate value even when the current consumption a and the processing time period Ta are changed because of change of a temperature environment and so on, or when the discharge characteristics of the plurality of battery cells 10 are changed.

In the foregoing equalization processing, the group to which the battery cell 10 having the SOCmax belongs is selected in Step S8. Here, when there are the plurality of battery cells 10 having the SOCmax, any one of the plurality of battery cells 10 is selected, and the group to which the selected battery cell 10 belongs is selected.

In this case, the battery cell 10, which has the highest potential in the series connection, of the plurality of battery cells 10 having the SOCmax may be selected, or the battery cell 10, which has the lowest potential in the series connection, of the plurality of battery cells 10 having the SOCmax may be selected, for example.

The processes of Steps S8, S9 may be performed after the processes of Steps S10, S11. For example, when SOCmax−SOCmin is larger than the prescribed value X stored in the memory 101b in Step S7, the battery ECU 101 turns on the switching element SW corresponding to the battery cell 10, which has the larger SOC than the value obtained by adding the prescribed value α stored in the memory 101b to the SOCmin, of all the battery cells 10 (Step S10), and turns off the other switching elements SW (Step S11).

Then, the battery ECU 101 determines the battery cell 10 having the SOCmax, selects the group, to which the battery cell 10 belongs, of the plurality of groups (Step S8), and turns off the plurality of switching elements SW corresponding to the plurality of battery cells 10, respectively, of the groups that are not selected (Step S9).

(4) Effects of the First Embodiment

In the equalization device 200, the SOCs are calculated based on the open circuit voltages of the plurality of battery cells 10 detected by the detecting unit 20. Then, any of the plurality of groups is selected based on the calculated SOCs, and the battery cells 10 belonging to the selected group are selectively discharged, so that the equalization processing is performed.

In this case, the battery cells 10 belonging to the different groups are discharged at different timings. Thus, the number of the battery cells 10 that are discharged at the same time can be decreased. This leads to lower discharge currents from the battery cells 10 that are discharged at the same time. As a result, the plurality of battery cells 10 can be reliably equalized while heat generation can be suppressed.

2 Second Embodiment

(1) Configuration of Equalization Device

Figure 6:
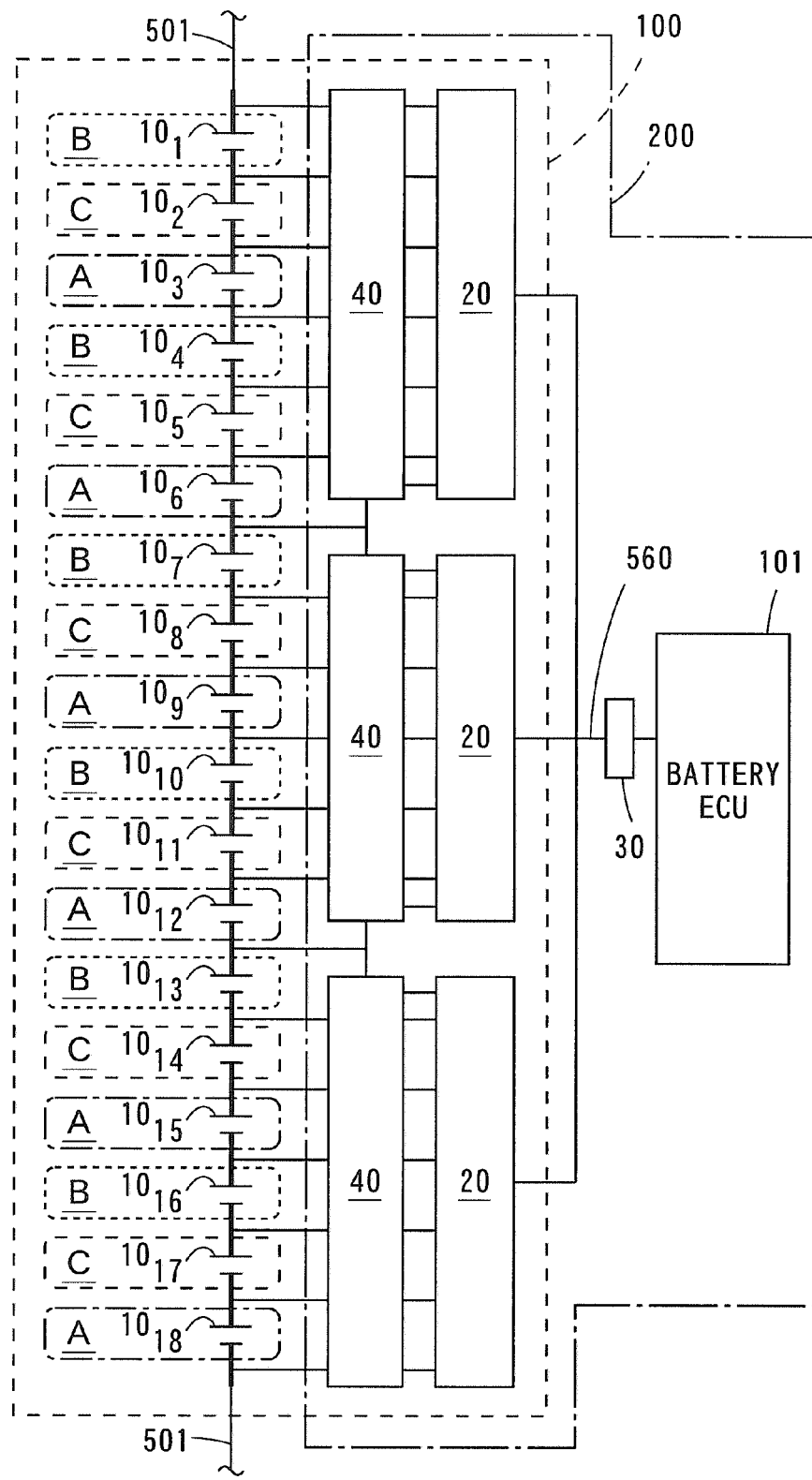
FIG. 6 is a block diagram showing one example of the configuration of an equalization device according to a second embodiment.

Description will be made of an equalization device according to a second embodiment while referring to differences from the first embodiment. FIG. 6 is a block diagram showing one example of the configuration of the equalization device according to the second embodiment.

In the battery module 100, a first battery cell 10 to an N-th battery cell 10 sequentially arranged from one end to the other end of the series connection are referred to as battery cells $10_1$ to $10_N$. The plurality of battery cells $10_1$ to $10_N$ are divided into first to M-th groups. Here, each of M and N is a natural number of not less than two.

In this case, the plurality of battery cells $10_1$ to $10_N$ are divided such that an arbitrary i-th battery cell $10_i$ belongs to (k+1)-th group when a remainder resulting from dividing i by M is k. Here, i is a natural number, and k is zero or a natural number.

In the example of FIG. 6, M=3, and N=18. Thus, the eighteen battery cells $10_1$ to $10_{18}$ are divided into a first group B, a second group C and a third group A.

In this case, the first, fourth, seventh, tenth, thirteenth and sixteenth battery cells $10_1$, $10_4$, $10_7$, $10_{10}$, $10_{13}$, $10_{16}$ belong to the group B. The second, fifth, eighth, eleventh, fourteenth and seventeenth battery cells $10_2$, $10_5$, $10_8$, $10_{11}$, $10_{14}$, $10_{17}$ belong to the group C. The third, sixth, ninth, twelfth, fifteenth and eighteenth battery cells $10_3$, $10_6$, $10_9$, $10_{12}$, $10_{15}$, $10_{18}$ belong to the group A.

As a result, the first to N-th battery cells $10_1$ to $10_N$ are divided into the first to M-th groups such that each two of the battery cells connected adjacent to each other belong to different groups of the three groups A, B, C in the equalization device 200 of FIG. 6.

(2) Effects of the Second Embodiment

In the equalization device 200, the battery cell 10, which is connected adjacent to the battery cell belonging to the group selected during the equalization processing, belongs to a different group.

Here, the battery cell 10, which belongs to the group that is not selected, is not discharged. This prevents each two of the battery cells 10 connected adjacent to each other from being discharged at the same time. Accordingly, each two of the resistors R connected adjacent to each other are prevented from generating heat at the same time. This causes heating portions to be distributed, thus preventing a local increase in temperature.

3 Third Embodiment

Description will be made of an electric vehicle according to a third embodiment. The electric vehicle according to the present embodiment includes the battery system 500 of FIG. 1. In the following paragraphs, an electric automobile is described as one example of the electric vehicle.

(1) Configuration and Operation

Figure 7:
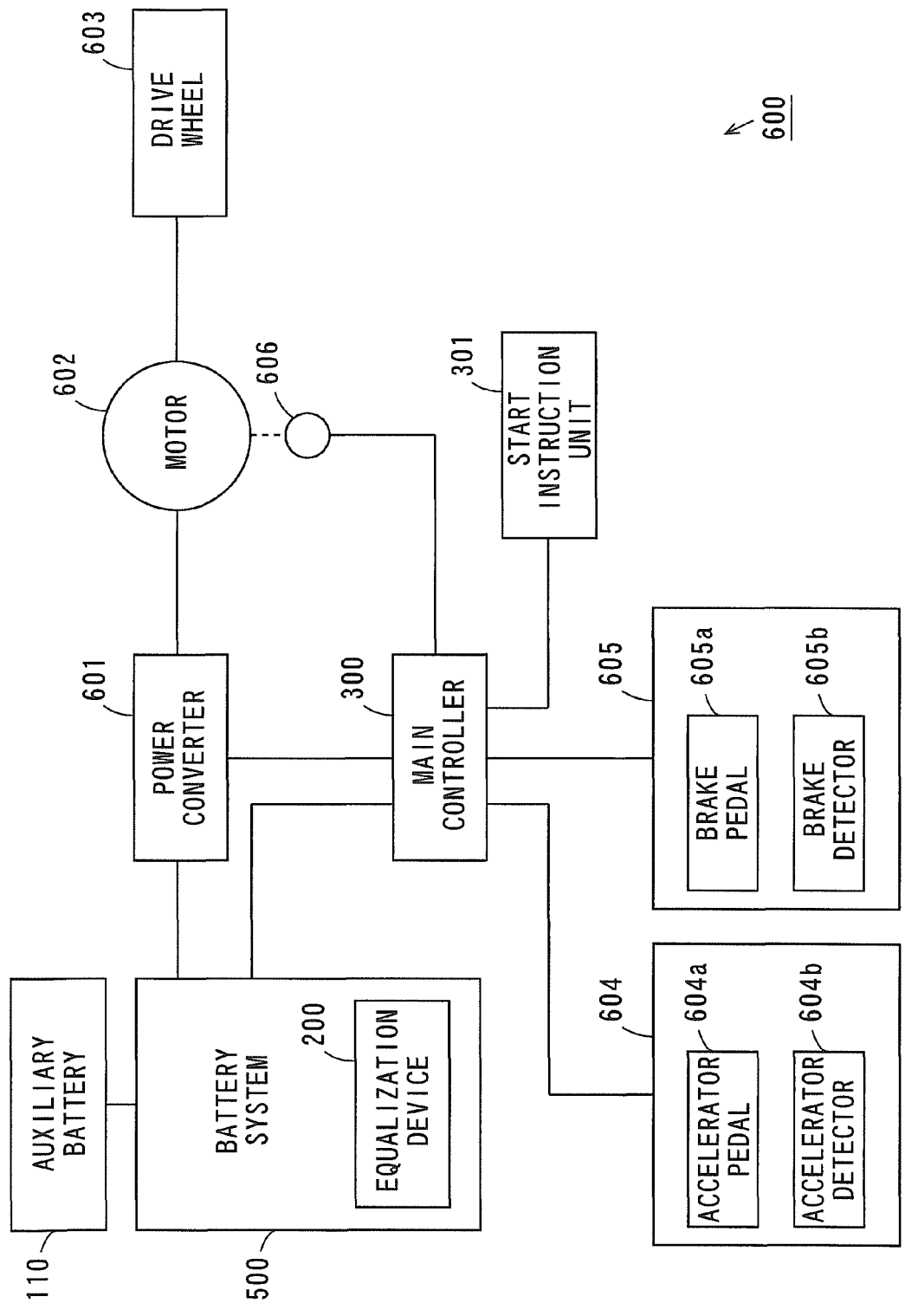
FIG. 7 is a block diagram showing the configuration of an electric automobile according to a third embodiment.

FIG. 7 is a block diagram showing the configuration of the electric automobile according to the third embodiment. As shown in FIG. 7, the electric automobile 600 according to the present embodiment includes the auxiliary battery 110, the main controller 300, the start instruction unit 301 and the battery system 500 of FIG. 1, a power converter 601, the motor 602, the drive wheel 603, an accelerator system 604, a brake system 605, and a rotational speed sensor 606. When the motor 602 is an alternating current (AC) motor, the power converter 601 includes an inverter circuit. The battery system 500 is provided with the equalization device 200.

As described above, the auxiliary battery 110 is connected to the battery system 500. The battery system 500 is connected to the motor 602 via the power converter 601 while being connected to the main controller 300.

Amounts of charge of the plurality of battery modules 100 (FIG. 1) are applied from the battery ECU 101 (FIG. 1) constituting the battery system 500 to the main controller 300. Each of the accelerator system 604, the brake system 605 and the rotational speed sensor 606 is connected to the main controller 300. The main controller 300 is composed of a CPU and a memory, or composed of a microcomputer, for example. In addition, the start instruction unit 301 of FIG. 1 is connected to the main controller 300.

The accelerator system 604 includes an accelerator pedal 604a included in the electric automobile 600 and an accelerator detector 604b that detects an operation amount (depression amount) of the accelerator pedal 604a.

When the accelerator pedal 604a is operated by the user while the start key of the start instruction unit 301 is turned on, the accelerator detector 604b detects the operation amount of the accelerator pedal 604a. Note that a state of the accelerator pedal 604a when not being operated by the user is set as a reference. The detected operation amount of the accelerator pedal 604a is applied to the main controller 300.

The brake system 605 includes a brake pedal 605a included in the electric automobile 600 and a brake detector 605b that detects an operation amount (depression amount) of the brake pedal 605a by the user. When the brake pedal 605a is operated by the user while the start key is turned on, the operation amount is detected by the brake detector 605b. The detected operation amount of the brake pedal 605a is applied to the main controller 300. The rotational speed sensor 606 detects a rotational speed of the motor 602. The detected rotational speed is applied to the main controller 300.

As described above, the amounts of charge of the battery modules 100, the value of the current flowing through the battery modules 100, the operation amount of the accelerator pedal 604a, the operation amount of the brake pedal 605a and the rotational speed of the motor 602 are applied to the main controller 300. The main controller 300 performs charge/discharge control of the battery modules 100 and power conversion control of the power converter 601 based on the information. Electric power generated by the battery modules 100 is supplied from the battery system 500 to the power converter 601 at the time of startup and acceleration of the electric automobile 600 based on the accelerator operation, for example.

Furthermore, with the start key turned on, the main controller 300 calculates a torque (commanded torque) to be transmitted to the drive wheel 603 based on the applied operation amount of the accelerator pedal 604a, and applies a control signal based on the commanded torque to the power converter 601.

The power converter 601 receives the control signal, and then converts the electric power supplied from the battery system 500 into electric power (driving power) required for driving the drive wheel 603. Accordingly, the driving power converted by the power converter 601 is supplied to the motor 602, and the torque of the motor 602 based on the driving power is transmitted to the drive wheel 603.

At the time of deceleration of the electric automobile 600 based on the brake operation, the motor 602 functions as the power generation system. In this case, the power converter 601 converts regenerated electric power generated by the motor 602 to electric power suitable for charging the battery modules 100, and supplies the electric power to the battery modules 100. This causes the battery modules 100 to be charged.

Meanwhile, with the start key turned off, the plurality of battery cells 10 (FIG. 1) are subjected to the equalization processing by the equalization device 200 of the battery system 500.

(2) Effects

As described above, the equalization device 200 according to the first embodiment is provided in the battery system 500 of the electric automobile 600 according to the present embodiment. Accordingly, the plurality of battery cells 10 can be reliably equalized while heat generation can be suppressed, resulting in improved reliability and longer life of the electric automobile 600.

4 Other Embodiments (1) While the SOC is used as the charge state of each of the battery cells 10 in the foregoing embodiments, any of the remaining capacity, the open circuit voltage, a depth of discharge, a current integrated value and a difference of an amount of stored charges of each of the battery cells 10 may be used as the charge state instead of the SOC.

As described above, the remaining capacity of the battery cell 10 is an amount of charges stored in the battery cell in a given state. Therefore, the remaining capacity is obtained by calculating the SOC of each battery cell 10 and multiplying the calculated SOC by the full charge capacity that has been previously measured in the same manner as the foregoing embodiments, for example.

The open circuit voltage of the battery cell 10 can be detected by the detecting unit 20 similarly to the foregoing embodiments.

The depth of discharge of the battery cell 10 is a ratio of a chargeable capacity (a capacity obtained by subtracting the remaining capacity from the full charge capacity of the battery) to the full charge capacity of the battery. In this case, the depth of discharge can be represented by (100−SOC) %. Therefore, the depth of discharge is obtained by calculating the SOC of each battery cell 10 and then subtracting the calculated SOC from 100 similarly to the foregoing embodiments, for example.

The current integrated value is obtained by detecting a current flowing through each of the plurality of battery cells 10 in a given period during charge or discharge, and integrating detected values, for example. In this case, a current detector for detecting the current flowing through each of the battery cells 10 is provided.

The difference of the amount of stored charges is obtained by calculating the SOC of each battery cell 10, and then calculating a difference between the calculated SOC and a predetermined reference SOC (SOC 50%, for example) similarly to the foregoing embodiments, for example.

When the depth of discharge is used as the charge state, the battery cell having the highest charge state among the charge states of the plurality of battery cells 10 refers to the battery cell having the lowest depth of discharge among the depths of discharge of the plurality of battery cells 10.

(2) While each of the numbers of the detecting units 20 and the discharging units 40 is equal to the number of the plurality of groups in the foregoing embodiments, the present invention is not limited to this. The detecting units 20 and discharging units 40 each having a different number from the number of the plurality of groups may be provided. For example, one detecting unit 20 and one discharging unit 40 may be provided in each battery module 100 as shown in FIG. 8.

Figure 8:
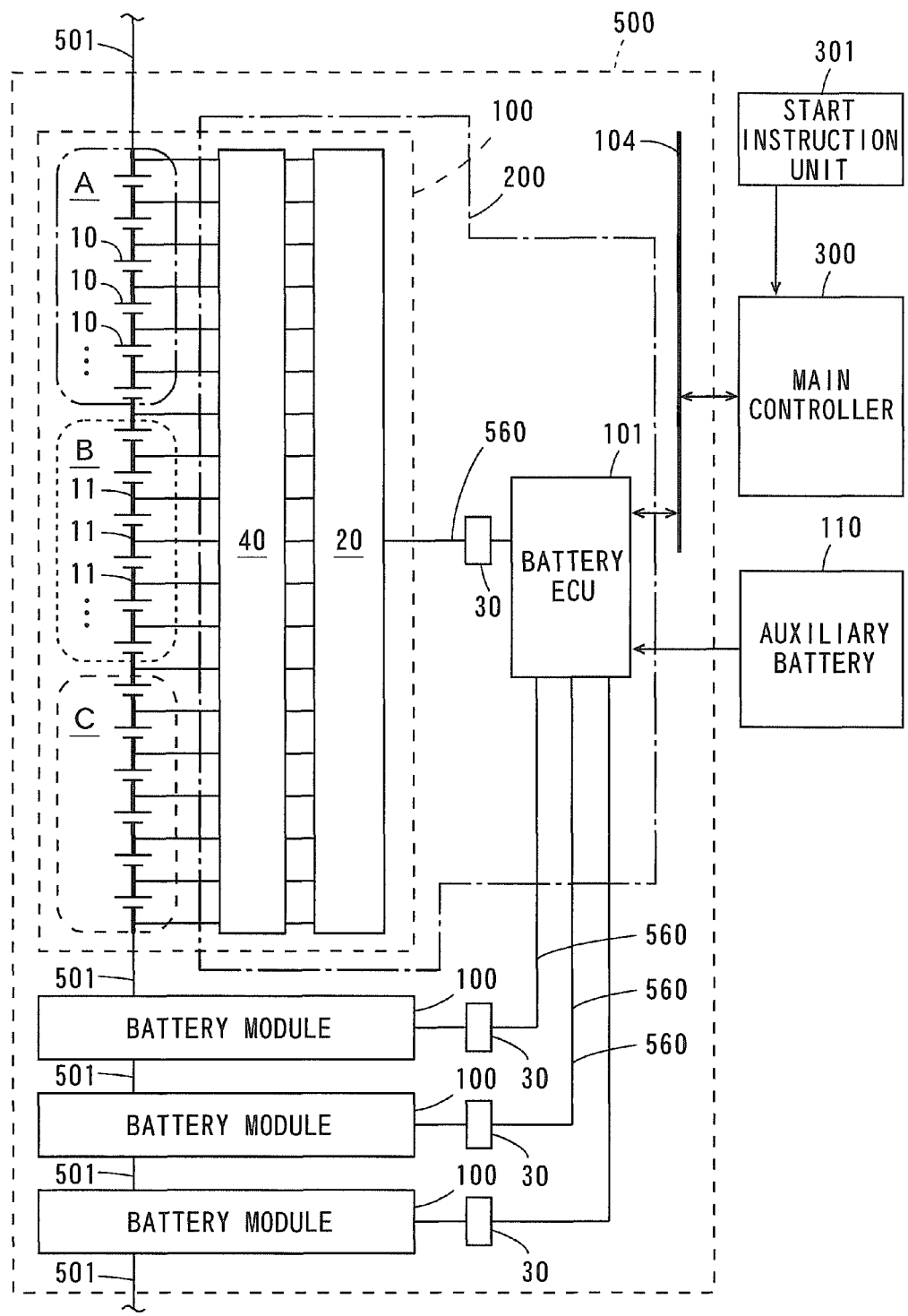
FIG. 8 is a block diagram showing the configuration of a battery system including an equalization device according to another embodiment.

FIG. 8 is a block diagram showing the configuration of a battery system including an equalization device according to another embodiment. In the example of FIG. 8, each battery module 100 is provided with one detecting unit 20 and one discharging unit 40. In this case, the detecting unit 20 is configured to be capable of detecting the open circuit voltages of all the battery cells 10 in each battery module 100, and the discharging unit 40 is configured to be capable of causing all the battery cells 10 in each battery module 100 to be discharged.

(3) While the plurality of battery cells 10 are divided into the plurality of groups in each battery module 100 in the foregoing embodiments, the present invention is not limited to this. The plurality of battery cells 10 in each battery module 100 may not be divided into the plurality of groups, and the plurality of battery cells 10 in the battery system 500 may be divided into the plurality of groups. In this case, the equalization processing is prevented from being performed at the same time in the plurality of battery modules 100. This sufficiently suppresses an increase in temperature of the entire battery system 500.

(4) While the lithium-ion battery is used as the battery cell 10 in the foregoing embodiments, the present invention is not limited to this. For example, another secondary battery such as a nickel metal hydride battery can be also used.

5 Correspondences Between Elements in the Claims and Parts in Embodiments

In the following paragraph, non-limiting examples of correspondences between various elements recited in the claims below and those described above with respect to various preferred embodiments of the present invention are explained.

In the foregoing embodiments, the detecting unit 20 including the multiplexer 20a, the A/D (Analog/Digital) converter 20b and the differential amplifiers 20c is an example of a detector, the battery ECU 101 is an example of a selector, the CPU or the microcomputer of the battery ECU 101 is an example of a computer, and the discharging unit 40 and the battery ECU 101 are an example of an equalization processing unit. The SOC, the remaining capacity, the voltage, the depth of discharge, the current integrated value and the difference of the amount of stored charges are examples of a charge state. The electric automobile 600 is an example of an electric vehicle.

The equalization device 200 is an example of an equalization device, the battery cell 10 is an example of a battery cell, the groups A, B, C are examples of a plurality of groups, and the detecting unit 20 is an example of a detecting unit. The battery system 500 is an example of a battery system, the motor 602 is an example of a motor, and the drive wheel 603 is an example of a drive wheel.

The processes of Steps S4, S5 of FIG. 4 by the battery ECU 101 are an example of a process and a step of acquiring charge states of a plurality of battery cells.

The process of Step S8 of FIG. 5 by the battery ECU 101 is an example of a process and a step of selecting any of the plurality of groups based on the acquired charge states.

The processes of Steps S9, S10, S11 of FIG. 5 by the battery ECU 101 are an example of a process and a step of performing processing by selectively causing the battery cells that belong to the selected group to discharge.

As each of various elements recited in the claims, not only the elements described in the foregoing embodiments but also various other elements having configurations or functions described in the claims can be used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

We claim:

1. An equalization device arranged to perform equalization processing of charge states of a plurality of battery cells that are connected in series, wherein
said plurality of battery cells are divided into a plurality of groups,
said equalization device comprising:
a detector arranged to detect the charge states of said plurality of battery cells;
a selector arranged to select any of said plurality of groups based on the charge states detected by said detector; and
an equalization processing unit arranged to perform the equalization processing by selectively causing the battery cells that belong to the group selected by said selector to discharge such that the battery cells that belong to different groups are discharged at different time points.

2. The equalization device according to claim 1, wherein said selector selects the group to which the battery cell having a highest charge state among the charge states of the plurality of battery cells detected by said detector belongs.

3. The equalization device according to claim 1, wherein said detector includes a plurality of detecting units corresponding to said plurality of groups, respectively, and
each of said plurality of detecting units is configured to detect the charge states of the battery cells that belong to the corresponding group.

4. The equalization device according to claim 1, wherein said plurality of battery cells are divided into said plurality of groups such that each two of the battery cells that are connected adjacent to each other belong to different groups.

5. The equalization device according to claim 1, wherein said plurality of groups include a first group to an M-th group, M is a natural number of not less than two, said plurality of battery cells include a first battery cell to an N-th battery cell sequentially arranged from one end to the other end of series connection, and N is a natural number of not less than 2M, and
said plurality of battery cells are divided into said plurality of groups such that when a remainder resulting from dividing i by M is k, an arbitrary i-th battery cell belongs to a "k+1-th" group.

6. The equalization device according to claim 1, wherein said charge state is any of a rate of charge, a remaining capacity, a voltage, a depth of discharge, a current integrated value and a difference of an amount of stored charges.

7. An equalization processing program that is executable by a computer for performing equalization processing of charge states of a plurality of battery cells that are connected in series and divided into a plurality of groups, causing said computer to execute the processes of:
acquiring the charge states of said plurality of battery cells;
selecting any of said plurality of groups based on the acquired charge states; and
performing the equalization processing by selectively causing the battery cells that belong to the selected group to discharge such that the battery cells that belong to different groups are discharged at different time points.

8. A battery system comprising: a plurality of battery cells that are connected in series; and the equalization device according to claim 1.

9. An electric vehicle comprising:
a plurality of battery cells that are connected in series and divided into a plurality of groups;
the equalization device according to claim 1; a motor driven by electric power supplied from said plurality of battery cells; and
a drive wheel rotated by a torque generated by said motor.

10. An equalization processing method for performing equalization processing of charge states of a plurality of battery cells that are connected in series and divided into a plurality of groups, comprising the steps of:
acquiring the charge states of said plurality of battery cells;
selecting any of said plurality of groups based on the acquired charge states; and
performing the equalization processing by selectively causing the battery cells that belong to the selected group to discharge such that the battery cells that belong to different groups are discharged at different time points.

* * * * *